(12) United States Patent
Zeng et al.

(10) Patent No.: US 9,870,406 B2
(45) Date of Patent: Jan. 16, 2018

(54) USER RECOMMENDATION METHOD AND SYSTEM IN SNS COMMUNITY, AND COMPUTER STORAGE MEDIUM

(71) Applicant: TENCENT TECHNOLOGY (SHENZHEN) COMPANY LIMITED, Shenzhen, Guangdong (CN)

(72) Inventors: Lei Zeng, Shenzhen (CN); Minge Li, Shenzhen (CN)

(73) Assignee: TENCENT TECHNOLOGY (SHENZHEN) CO., LTD., Shenzhen (CN)

( * ) Notice: Subject to any disclaimer, the term of this patent is extended or adjusted under 35 U.S.C. 154(b) by 307 days.

(21) Appl. No.: 14/556,528

(22) Filed: Dec. 1, 2014

(65) Prior Publication Data

US 2015/0088914 A1 Mar. 26, 2015

Related U.S. Application Data

(63) Continuation-in-part of application No. PCT/CN2013/076486, filed on May 30, 2013.

(30) Foreign Application Priority Data

Jun. 1, 2012 (CN) .......................... 2012 1 0178965

(51) Int. Cl.
*G06F 17/30* (2006.01)
*H04L 29/08* (2006.01)
(Continued)

(52) U.S. Cl.
CPC .... *G06F 17/3053* (2013.01); *G06F 17/30702* (2013.01); *G06F 17/30867* (2013.01);
(Continued)

(58) Field of Classification Search
CPC .......... G06F 17/3053; G06F 17/30702; G06F 17/30867; G06F 17/30861; G06F 3/04842;
(Continued)

(56) References Cited

U.S. PATENT DOCUMENTS 8,838,581 B2 * 9/2014 Tseng ................ G06F 17/30867
705/319
9,258,264 B1 * 2/2016 Shoham .................. H04L 51/32
705/14.66
(Continued)

OTHER PUBLICATIONS

International Search Report (Form PCT/ISA/210) dated Sep. 5, 2013 in corresponding PCT Application No. PCT/CN2013/076486 (3 pages) (3 pages English Translation).
(Continued)

*Primary Examiner* — Anh Ly
(74) *Attorney, Agent, or Firm* — Staas & Halsey LLP

(57) ABSTRACT

The present invention relates to a user recommendation method and system in SNS community and a computer storage medium. The method includes following steps: obtaining an interaction record between a first user and a second user in a first community; generating an interaction frequency of the first user and the second user according to the interaction record; calculating familiarity of the first user and the second user according to the interaction frequency; recommending the second user whose familiarity with the first user exceeds a threshold to the first user in a second community. The method and system and computer storage medium calculate familiarity between users in other community, recommend other users to the user in current community according to familiarity, expand information sources used for determining which users are persons user may
(Continued)

possibly know, thereby obtaining more persons user may possibly know and improving efficiency of expanding user relationship circle.

13 Claims, 5 Drawing Sheets

(51) Int. Cl.
    *G06Q 50/00*     (2012.01)
    *H04L 12/58*     (2006.01)
    *H04L 12/18*     (2006.01)

(52) U.S. Cl.
    CPC .............. *G06Q 50/01* (2013.01); *H04L 51/32* (2013.01); *H04L 67/22* (2013.01); *H04L 12/1831* (2013.01)

(58) Field of Classification Search
    CPC . H04L 51/32; H04L 67/6722; H04L 12/1813; H04L 29/08; H04L 12/588; H04L 29/06414; H04L 67/22; G06Q 10/10; G06Q 30/00; G06Q 50/01
    See application file for complete search history.

(56) References Cited

U.S. PATENT DOCUMENTS

| | | | | |
|---|---|---|---|---|
| 2008/0126476 A1* | 5/2008 | Nicholas | ............... | G06Q 10/10 709/203 |
| 2009/0217178 A1* | 8/2009 | Niyogi | ............... | G06Q 10/00 715/753 |
| 2009/0292526 A1* | 11/2009 | Harari | ............... | G06F 17/2765 704/9 |
| 2010/0005518 A1* | 1/2010 | Tirpak | ............... | H04L 67/306 726/6 |
| 2010/0036912 A1* | 2/2010 | Rao | ............... | H04L 51/20 709/204 |
| 2010/0241576 A1* | 9/2010 | Beeri | ............... | G06Q 30/02 705/80 |
| 2010/0287033 A1* | 11/2010 | Mathur | ............ | G06F 17/30867 705/319 |
| 2011/0066507 A1* | 3/2011 | Iyer | ............... | G06Q 30/02 705/14.66 |
| 2011/0173046 A1* | 7/2011 | Dey | ............... | G06Q 30/02 705/7.33 |
| 2011/0196922 A1* | 8/2011 | Marcucci | ............... | G06Q 10/10 709/204 |
| 2011/0238755 A1* | 9/2011 | Khan | ............... | G06Q 50/01 709/204 |
| 2011/0289011 A1* | 11/2011 | Hull | ............... | G06Q 10/107 705/319 |
| 2011/0296506 A1* | 12/2011 | Caspi | ............... | H04L 12/1822 726/6 |
| 2012/0047150 A1* | 2/2012 | Spiegel | ............... | G06Q 30/02 707/748 |
| 2012/0059922 A1* | 3/2012 | Jason | ............... | H04L 12/14 709/223 |
| 2012/0290635 A1* | 11/2012 | Yuki | ............... | G06Q 10/10 709/202 |
| 2012/0330758 A1* | 12/2012 | Kaushik | ............ | G06Q 30/0241 705/14.73 |
| 2013/0018954 A1* | 1/2013 | Cheng | ............... | G06Q 10/00 709/204 |
| 2013/0031192 A1* | 1/2013 | Caspi | ............... | H04L 65/1069 709/206 |
| 2013/0046770 A1* | 2/2013 | Tseng | ............ | G06F 17/30867 707/748 |
| 2013/0073473 A1* | 3/2013 | Heath | ............... | G06Q 30/02 705/319 |
| 2013/0091221 A1* | 4/2013 | Bennett | ............... | G06Q 30/00 709/204 |
| 2013/0097056 A1* | 4/2013 | Sun | ............... | G06Q 30/02 705/26.35 |
| 2013/0110978 A1* | 5/2013 | Gordon | ............ | H04N 21/2665 709/218 |
| 2013/0117108 A1* | 5/2013 | Spears | ............ | G06Q 30/0255 705/14.53 |
| 2013/0173344 A1* | 7/2013 | Kundagrami | .......... | G06Q 40/02 705/7.32 |
| 2013/0262559 A1* | 10/2013 | Neerings | ............... | G06Q 30/02 709/203 |
| 2014/0047051 A1* | 2/2014 | Li | ............... | H04L 67/02 709/206 |

OTHER PUBLICATIONS

Chinese Office Action dated Oct. 19, 2016 in corresponding Chinese Patent Application No. 201210178965.0 (5 pages).

"*Friend Recommendation Based on Community Division and User Similarity*"; Zhang Peng, Qiao Xiuquan, Li Xiaofeng; Sciencepaper Online; State Key Laboratory of Networking and Switching Technology, Beijing University of Posts and Telecommunications; Nov. 2, 2010; (10 pages).

* cited by examiner

USER RECOMMENDATION METHOD AND SYSTEM IN SNS COMMUNITY, AND COMPUTER STORAGE MEDIUM

CROSS-REFERENCE TO RELATED APPLICATIONS

The present application is a continuation-in-part application of International Application PCT/CN2013/076486, filed May 30, 2013, and claims foreign priority to application No. 201210178965.0, titled "User Recommendation Method and System in SNS Community", filed to China Patent Office on Jun. 1, 2012, which are incorporated herein by reference in their entireties.

FIELD OF THE INVENTION

The present invention relates to social networking service fields, and more particularly, to a user recommendation method and system in an SNS community, and a computer storage medium.

BACKGROUND OF THE INVENTION

Social networking service (referred to as "SNS") is an internet application service to help people establish a social network. An SNS community is a website or a platform that provides the social networking service. People make friends in a SNS community, and immediately share information and knowledge with the others. The SNS goes deeper and deeper in people's life, work and study.

Along with the network technology development, the SNS community has rapidly become a general platform including multiple functions of making friends, expanding relationship circle, showing self, sharing information, gaming and entertaining, etc. According to different particular functions, kinds of the SNS community can be different. For example, some SNS community has blog function and users can create their own-feature space in this SNS community. Other SNS community emphases the function of expanding user relationship circle to provide the users with a making-friend platform. Along with the information technology development and continuous update of network applications, the users' needs change continuously. Therefore, SNS communities having new functions derive from old SNS communities to satisfy the users' needs.

The SNS community generally has a user recommendation function, i.e., other users that a user may be interested in can be recommended to the user. The user recommendation function of the SNS community can help the user to find other users that he/she may be interested in, thereby expanding relationship circle of the user effectively to avoid losing community users. The conventional user recommendation method in the SNS community is to associate the SNS community with the instant messaging. If users are friends in the instant messaging, then the friend in the instant messaging is recommended to the user in the SNS community.

However, the conventional user recommendation method in the SNS community only recommends friends in the instant messaging to the user. This results in a small amount of recommendation users and may miss many persons who the user is more interested in. Therefore, the conventional user recommendation method in the SNS community lowers efficiency of expanding user relationship circle.

SUMMARY OF THE INVENTION

Accordingly, it is necessary to provide a user recommendation method capable of improving efficiency of expanding user relationship circle.

The user recommendation method in an SNS community includes: obtaining an interaction record between a first user and a second user in a first community;
generating an interaction frequency of the first user and the second user according to the interaction record;
calculating familiarity of the first user and the second user according to the interaction frequency;
recommending the second user whose familiarity with the first user exceeds a threshold to the first user in a second community.

In one embodiment, the interaction record includes at least one operation record selected from the group consisting of visiting, commenting, replying, giving a like, forwarding, transmitting, and sharing between the first user and the second user.

In one embodiment, the method further includes: generating closeness of the first user and the second user according to a user relationship chain in the first community and a user relationship chain in the second community;
the step of calculating familiarity of the first user and the second user according to the interaction frequency includes: calculating the familiarity of the first user and the second user according to the interaction frequency and the closeness.

In one embodiment, the step of generating closeness of the first user and the second user according to a user relationship chain in the first community and a user relationship chain in the second community includes:
determining which relationship of the following relationships of the first user and the second user is in the first community according to the user relationship chain in the first community: the second user being a friend of the first user, the second user being a twice friend of the first user, the second user being a user that the first user listens in or concerns;
determining whether the second user is the twice friend of the first user in the second community according to the user relationship chain in the second community;
increasing the closeness of the first user and the second user according to a preset weight, if the second user is the friend of the first user, or the second user is the twice friend of the first user, or the second user is a user that the first user listens in or concerns in the first community, or the second user is the twice friend of the first user in the second community.

In one embodiment, the method further includes:
presetting a weight corresponding to a relationship of the first user and the second user, and setting rank of weights corresponding to the following relationships from high to low:
the second user being a friend of the first user in the first community, the second user being a user that the first user listens in or concerns in the first community, the second user being a twice friend of the first user in the second community, the second user being a twice friend of the first user in the first community.

In one embodiment, the method further includes:
calculating similarity of the first user and the second user according to personal data of the first user and the second user in the first community and personal data of the first user and the second user in the second community;
the step of calculating familiarity of the first user and the second user according to the interaction frequency includes:

calculating the familiarity of the first user and the second user according to the interaction frequency, the closeness and the similarity.

In one embodiment, the step of calculating the familiarity of the first user and the second user according to the interaction frequency, the closeness and the similarity includes:

presetting weights corresponding to the interaction frequency, the closeness and the similarity of the first user and the second user respectively; increasing the familiarity of the first user and the second user according to the interaction frequency, the closeness, the similarity and the weights corresponding to the interaction frequency, the closeness and the similarity.

In one embodiment, a first community user identity and a second community user identity of the same user are different, and the first community and the second community share a user identity corresponding relationship database, and the user identity corresponding relationship database stores a corresponding relationship between the first community user identity and the second community user identity of the same user;

the step of recommending the second user whose familiarity with the first user exceeds a threshold to the first user in a second community includes:

obtaining a second community user identity of the first user;

finding a first community user identity of the first user according to the second community user identity of the first user and the corresponding relationship between the first community user identity and the second community user identity of the first user;

obtaining a first community user identity of the second user corresponding to the first community user identity of the first user and whose familiarity with the first user exceeds the threshold;

finding a second community user identity of the second user according to the first community user identity of the second user and the corresponding relationship;

showing a list of second users found corresponding to the second community user identity to the first user.

Accordingly, it is necessary to provide a user recommendation system capable of improving efficiency of expanding user relationship circle.

The user recommendation system in an SNS community includes:

a record obtaining module configured to obtain an interaction record of a first user and a second user in a first community;

an interaction frequency generating module configured to generate an interaction frequency of the first user and the second user according to the interaction operation;

a familiarity calculating module configured to calculate the familiarity of the first user and the second user according to the interaction frequency;

a recommending module configured to recommend the second user whose familiarity with the first user exceeds a threshold to the first user in the second community.

In one embodiment, the interaction record includes at least one operation record selected from the group consisting of visiting, commenting, replying, giving a like, forwarding, transmitting, and sharing between the first user and the second user.

In one embodiment, the system further includes:
a closeness generating module configured to generate closeness of the first user and the second user according to a user relationship chain in the first community and a user relationship chain in the second community;

the familiarity calculating module configured to calculate the familiarity of the first user and the second user according to the interaction frequency and the closeness.

In one embodiment, the closeness generating module is configured to determine which relationship of the following relationships of the first user and the second user is in the first community according to the user relationship chain in the first community:

the second user being a friend of the first user, the second user being a twice friend of the first user, the second user being a user that the first user listens in or concerns, and configured to determine whether the second user is the twice friend of the first user in the second community according to the user relationship chain in the second community, and configured to increase the closeness of the first user and the second user according to a preset weight, if the second user is the friend of the first user, or the second user is the twice friend of the first user, or the second user is a user that the first user listens in or concerns in the first community, or the second user is the twice friend of the first user in the second community.

In one embodiment, the closeness generating module is further configured to preset a weight corresponding to a relationship of the first user and the second user, and configured to set rank of weights corresponding to the following relationships from high to low:

the second user being a friend of the first user in the first community, the second user being a user that the first user listens in or concerns in the first community, the second user being a twice friend of the first user in the second community, the second user being a twice friend of the first user in the first community.

In one embodiment, the system further includes:
a similarity calculating module configured to calculate similarity of the first user and the second user according to personal data of the first user and the second user in the first community and personal data of the first user and the second user in the second community;

the familiarity calculating module configured to calculate the familiarity of the first user and the second user according to the interaction frequency, the closeness and the similarity.

In one embodiment, the familiarity calculating module is further configured to preset weights corresponding to the interaction frequency, the closeness and the similarity of the first user and the second user respectively and configured to increase the familiarity of the first user and the second user according to the interaction frequency, the closeness, the similarity and the weights corresponding to the interaction frequency, the closeness and the similarity.

In one embodiment, a first community user identity and a second community user identity of the same user are different, and the first community and the second community share a user identity corresponding relationship database, and the user identity corresponding relationship database stores a corresponding relationship between the first community user identity and the second community user identity of the same user;

the recommendation module is further configured to obtain a second community user identity of the first user, configured to find a first community user identity of the first user according to the second community user identity of the first user and the corresponding relationship between the first community user identity and the second community user identity of the first user, configured to obtain a first community user identity of the second user corresponding to the first community user identity of the first user and whose familiarity with the first user exceeds the threshold, configured to find a second community user identity of the second user according to the first community user identity of the second user and the corresponding relationship, and configured to show a list of second users found corresponding to the second community user identity to the first user.

Moreover, a computer storage medium is provided.

One or more computer storage medium includes computer-executable instructions. The computer-executable instructions are used for executing a user recommendation method in an SNS community. The method includes the following steps:
obtaining an interaction record between a first user and a second user in a first community;
generating an interaction frequency of the first user and the second user according to the interaction record;
calculating familiarity of the first user and the second user according to the interaction frequency;
recommending the second user whose familiarity with the first user exceeds a threshold to the first user in a second community.

The user recommendation method and system in the SNS community and the computer storage medium generate an interaction frequency of the first user and the second user according to the interaction record and calculate familiarity of the first user and the second user according to the interaction frequency and recommend the second user whose familiarity with the first user exceeds a threshold to the first user in a second community. A high familiarity of the first user and the second user indicates that the second user is a person who the first user may possibly know. The method and the system calculate the familiarity between the users in other community, and recommend other users to the user in the current community according to the familiarity, and expand information sources that can be used for determining which users are persons who the user may possibly know, thereby obtaining more persons who the user may possibly know and improving the efficiency of expanding user relationship circle.

DETAILED DESCRIPTION OF THE EMBODIMENTS

Figure 1:
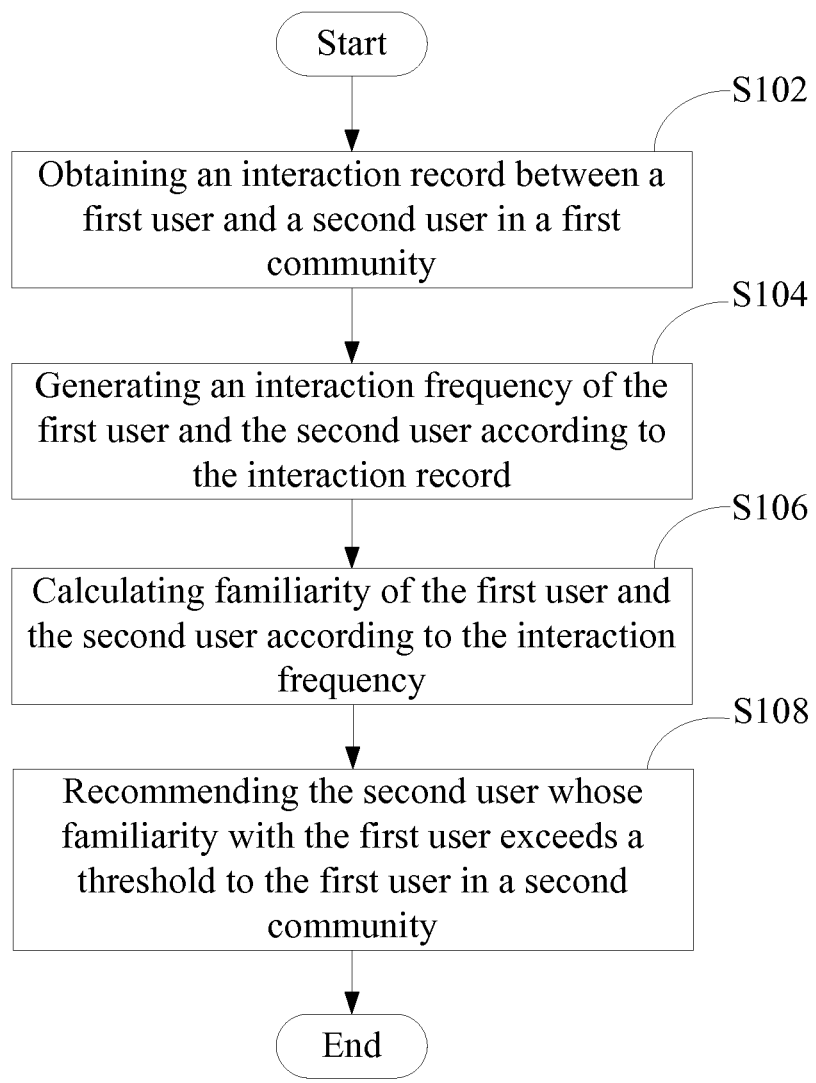
FIG. 1 is a flow diagram of a user recommendation method in an SNS community according to an embodiment.

As shown in FIG. 1, in an embodiment, a user recommendation method in an SNS community includes the following steps:
Step S102, obtaining an interaction record between a first user and a second user in a first community.

In an embodiment, number of the first community can be more than one and kind of the first community can also be more than one, such as microblog platform, forum community, etc. In step S102, a number of interaction records of the first user and the second user in the SNS community can be obtained.

In an embodiment, interaction operations between users in the first community can be pre-recorded, and the interaction records between the users are saved.

In an embodiment, the interaction operation is any read operation that a user reads relevant information of other user in the community and any write operation that the user applies to the relevant information of the other user in the community.

In an embodiment, the interaction record includes at least one operation record selected from the group consisting of visiting, commenting, replying, giving a like, forwarding, transmitting, and sharing operations, etc.

Step S104, generating an interaction frequency of the first user and the second user according to the interaction record.

In an embodiment, the user applying one read-operation to the relevant information of other user in the community, or applying one write-operation to the relevant information of other user in the community can be recorded as one interaction operation between the users.

Specifically, number of the interaction operation is counted in a specific period of time. The interaction frequency of the first user and the second user is calculated as a ratio of the number of the interaction operation to the specific period of time. In the embodiment, the number of the interaction operation is equal to number of interaction record.

Step S106, calculating familiarity of the first user and the second user according to the interaction frequency.

In an embodiment, the familiarity and the interaction frequency is preset as a direct-proportional relationship. The higher the interaction frequency of the first user and the second user is, the higher the familiarity of the first user and the second user is. After the interaction frequency of the first user and the second user is obtained, the familiarity of the first user and the second user can be increased according to the interaction frequency and the direct-proportional relationship.

Step S108, recommending the second user whose familiarity with the first user exceeds a threshold to the first user in a second community.

In an embodiment, the second user is recommended to the first user as a person who the first user may possibly know.

In an embodiment, a list including second users whose familiarities with the first user exceed the threshold is shown to the first user, allowing the first user to choose a second user that he/she wishes to add a friend, listen in or concern. Further, the second user that the first user chooses is obtained. The chosen second user is added to friends of the first user or added to listening-in or concern subjects of the first user.

In an embodiment, the step S108 can choose a second user that is not a friend of the first user in the second users whose familiarities with the first user exceed the threshold in the second community and recommends the chosen second user to the first user as a person who the first user may possibly know. In the embodiment, a second user that is a friend of the first user is filtered, avoiding repeatedly recommending a friend or a user that the first user has already listened-in or concerned to the first user.

In the user recommendation method in the SNS community, the users in the first community and the second community are registered users.

In an embodiment, the first community and the second community share a user verification information database. User identities of the same user in the first community and in the second community are the same. The user identity of the user in the first community is called a first community user identity of the user. The user identity of the user in the second community is called a second community user identity of the user.

In another embodiment, user identities of the same user in the first community and in the second community are different. The first community and the second community share a user identity corresponding relationship database. The user identity corresponding relationship database stores a corresponding relationship between the first community user identity and the second community user identity of the same user.

In the embodiment, the step S108 includes: obtaining a second community user identity of the first user; finding a first community user identity of the first user according to the second community user identity of the first user and the corresponding relationship; obtaining a first community user identity of the second user corresponding to the first community user identity of the first user and whose familiarity with the first user exceeds the threshold; finding a second community user identity of the second user according to the first community user identity of the second user and the corresponding relationship; showing a list of second users found corresponding to the second community user identity to the first user.

The user recommendation method in the SNS community generates the interaction frequency of the first user and the second user according to the interaction record between the first user and the second user in the first community, calculates familiarity of the first user and the second user according to the interaction frequency of the first user and the second user, and recommends the second user whose familiarity with the first user exceeds the threshold to the first user in the second community. A high familiarity of the first user and the second user indicates that the second user is a person who the first user may possibly know. The method calculates the familiarity between the users in other community, and recommends other users to the user in the current community according to the familiarity, and expands information sources that can be used for determining which users are persons who the user may possibly know, thereby obtaining more persons who the user may possibly know and improving the efficiency of expanding user relationship circle.

In an embodiment, the user recommendation method in the SNS community further includes a step: generating closeness of the first user and the second user according to a user relationship chain in the first community and a user relationship chain in the second community.

Specifically, the user relationship chain in the first community is a relationship chain established between users in the first community and includes a social relationship, such as a friend relationship, a listening-in relationship or a concern relationship, etc. The user relationship chain in the second community is a relationship chain established between users in the second community. Moreover, if the first user and the second user have a social relationship in the first community or in the second community, then the closeness of the first user and the second user is increased. In the embodiment, the step S106 includes: calculating the familiarity of the first user and the second user according to the interaction frequency and the closeness of the first user and the second user.

Specifically, in an embodiment, a weight corresponding to the interaction frequency of the first user and the second user, and a weight corresponding to the closeness of the first user and the second user are preset. The step S106 increases the familiarity of the first user and the second user according to the interaction frequency and the closeness of the first user and the second user and the weights corresponding to the interaction frequency and the familiarity. The higher the interaction frequency and the closeness of the first user and the second user are, the higher the familiarity of the first user and the second user is.

Figure 2:
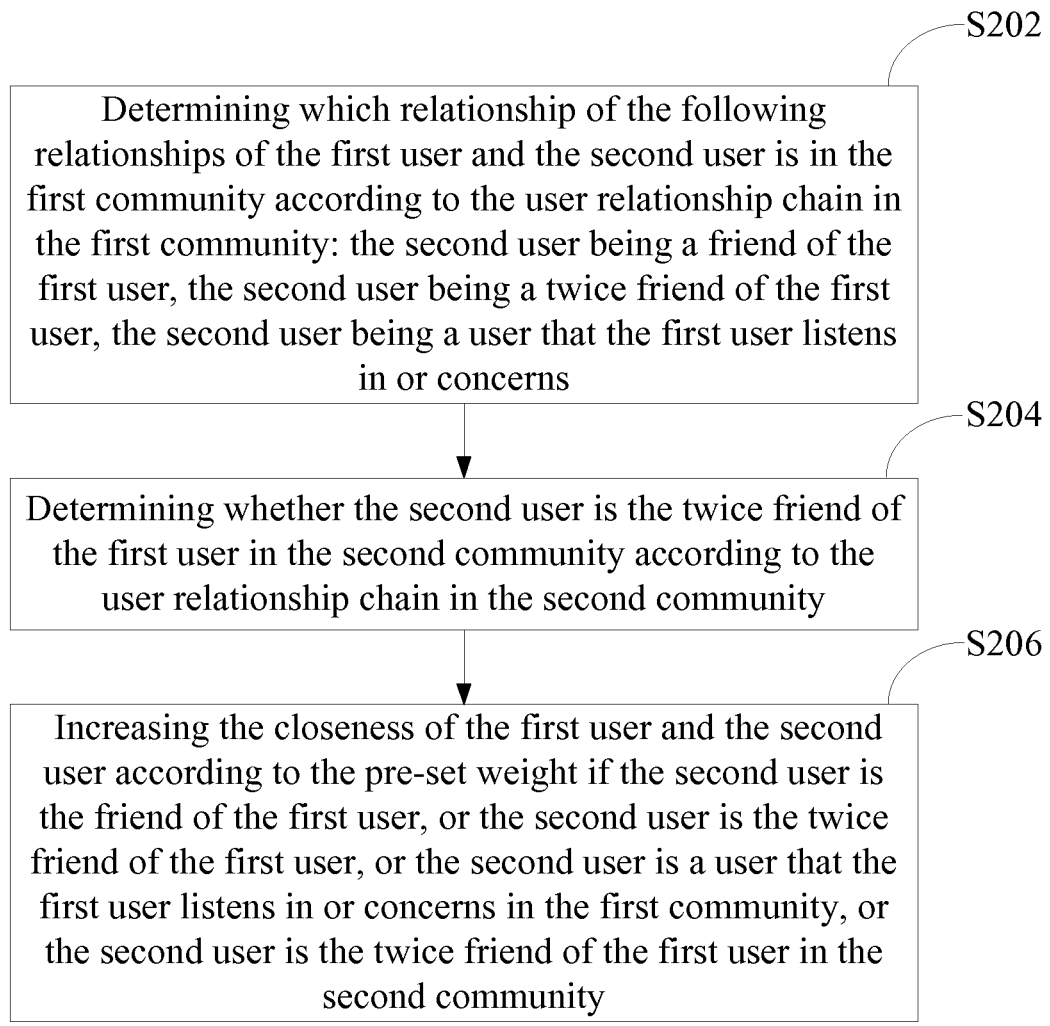
FIG. 2 is a flow diagram of generating closeness of a first user and a second user according to a user relationship chain in a first community and a user relationship chain in a second community according to an embodiment.

As shown in FIG. 2, in an embodiment, the step of generating the closeness between the users according to the user relationship chain in the first community and the user relationship chain in the second community includes:

Step S202, determining which relationship of the following relationships of the first user and the second user is in the first community according to the user relationship chain in the first community: the second user being a friend of the first user, the second user being a twice friend of the first user, the second user being a user that the first user listens in or concerns.

The second user being the twice friend of the first user means that the second user is a friend of a friend of the first user.

Step S204, determining whether the second user is the twice friend of the first user in the second community according to the user relationship chain in the second community.

Step S206, increasing the closeness of the first user and the second user according to a preset weight, if the second user is the friend of the first user, or the second user is the twice friend of the first user, or the second user is a user that the first user listens in or concerns in the first community, or the second user is the twice friend of the first user in the second community.

In an embodiment, a weight corresponding to a relationship of the first user and the second user is preset. Preferably, rank of weights corresponding to the following relationships is set from high to low: the second user being a friend of the first user in the first community, the second user being a user that the first user listens in or concerns in the first community, the second user being a twice friend of the first user in the second community, the second user being a twice friend of the first user in the first community. The closeness of the relationship of the first user and the second user in the above rank descends and the weight corresponding to the relationship also descends, thereby obtaining a more accurate closeness of the first user and the second user.

The user recommendation method in the SNS community generates closeness between the users according to the user relationship chain of the current community and the user relationship chain of other community, calculates familiarity between the users according to the interaction frequency between the users and the closeness of the users, recommends a person who the user may possibly know to the user in the current community according to the familiarity between the users. The method calculates the familiarity between the users according to multi-aspect information of the current community and the other community and can more accurately obtain an actual familiarity between the users, thereby improving the accuracy of recommending a person who the user may possibly know to the user.

In an embodiment, the user recommendation method in the SNS community further includes a step: calculating similarity of the first user and the second user according to personal data of the first user and the second user in the first community and personal data of the first user and the second user in the second community.

Specifically, if the personal data of the first user are the same as or similar to the personal data of the second user in the first community, or the personal data of the first user are the same as or similar to the personal data of the second user in the second community, then the similarity of the first user and the second user is increased accordingly.

Specifically, in an embodiment, the personal data include hometown, education history, work history, current residence, etc. If the hometown, the education history, the work history, and the current residence of the first user are the same as or similar to the hometown, the education history, the work history, and the current residence of the second user in the first community or in the second community, then the similarity of the first user and the second user can be increased according to a preset weight.

In the embodiment, the step S106 includes: calculating the familiarity of the first user and the second user according to the interaction frequency, the closeness and the similarity of the first user and the second user.

Specifically, in an embodiment, weights corresponding to the interaction frequency, the closeness and the similarity of the first user and the second user are preset respectively. The familiarity of the first user and the second user is increased according to the interaction frequency, the closeness, the similarity and the weights corresponding to the interaction frequency, the closeness and the similarity. The higher the interaction frequency, the closeness and the similarity of the first user and the second user are, the higher the familiarity of the first user and the second user is.

The user recommendation method in the SNS community calculates similarity between the users according to the personal data of the users in the current community and other community, calculates the familiarity between the users according to the interaction frequency, the closeness and the similarity between the users, and recommends a person who the user may possibly know to the user in the current community according to the familiarity between the users. The method calculates the familiarity between the users according to multi-aspect information of the current community and other community and can more accurately obtain an actual familiarity between the users, thereby improving the accuracy of recommending a person who the user may possibly know to the user.

Figure 3:
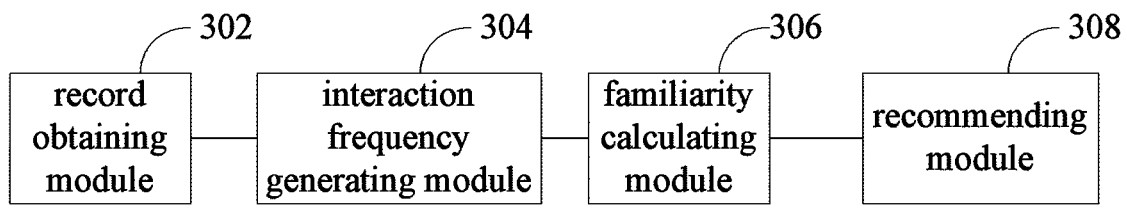
FIG. 3 is a block diagram of a user recommendation system in the SNS community according to an embodiment.

As shown in FIG. 3, in an embodiment, a user recommendation system in an SNS community includes a record obtaining module 302, an interaction frequency generating module 304, a familiarity calculating module 306 and a recommending module 308.

The record obtaining module 302 is configured to obtain an interaction record of a first user and a second user in a first community.

In an embodiment, number of the first community can be more than one and kind of the first community can also be more than one, such as microblog platform, forum community, etc. The record obtaining module 302 can obtain a number of interaction records of the first user and the second user in the SNS community.

In an embodiment, interaction operations between users in the first community can be pre-recorded, and the interaction records between the users are saved.

In an embodiment, the interaction operation is any read operation that a user reads relevant information of other user in the community and any write operation that the user applies to the relevant information of the other user in the community. In an embodiment, the interaction record includes at least one operation record selected from the group consisting of visiting, commenting, replying, giving a like, forwarding, transmitting, and sharing operations, etc.

The interaction frequency generating module 304 is configured to generate an interaction frequency of the first user and the second user according to the interaction operation.

In an embodiment, the user applying one read-operation to the relevant information of the other user in the community, or applying one write-operation to the relevant information of the other user in the community can be recorded as one interaction operation between the users.

Specifically, the interaction frequency generating module 304 counts number of the interaction operation in a specific period of time and calculates the interaction frequency of the first user and the second user as a ratio of the number of the interaction operation to the specific period of time.

The familiarity calculating module 306 is configured to calculate the familiarity of the first user and the second user according to the interaction frequency.

In an embodiment, the familiarity and the interaction frequency are preset as a direct-proportional relationship. The higher the interaction frequency of the first user and the second user is, the higher the familiarity of the first user and the second user is. The familiarity calculating module 306 increases the familiarity of the first user and the second user according to the interaction frequency and the direct-proportional relationship.

The recommending module 308 is configured to recommend the second user whose familiarity with the first user exceeds the threshold to the first user in the second community.

In an embodiment, the recommending module 308 recommends the second user to the first user as a person who the first user may possibly know.

In an embodiment, the recommending module 308 shows a list including second users whose familiarities with the first user exceed the threshold to the first user and allows the first user to choose a second user that he/she wishes to add a friend, listen in or concern. Further, the recommending module 308 can obtain the second user that the first user chooses and adds the chosen second user to a friend of the first user or adds to listening-in or concern subjects of the first user.

In an embodiment, the recommending module 308 can choose a second user that is not a friend of the first user in the second users whose familiarities with the first user exceed the threshold in the second community and recommend the chosen second user to the first user as a person who the first user may possibly know. In the embodiment, the second user that is a friend of the first user is filtered, avoiding repeatedly recommending a friend or a user that the first user has already listened-in or concerned to the first user.

In the user recommendation system in the SNS community, the users in the first community and the second community are registered users.

In an embodiment, the first community and the second community share a user verification information database. User identities of the same user in the first community and in the second community are the same. The user identity of the user in the first community is called a first community user identity of the user. The user identity of the user in the second community is called a second community user identity of the user.

In another embodiment, user identities of the same user in the first community and in the second community are different. The first community and the second community share a user identity corresponding relationship database. The user identity corresponding relationship database stores a corresponding relationship between the first community user identity and the second community user identity of the same user.

In the embodiment, the recommending module 308 can obtain a second community user identity of the first user; find a first community user identity of the first user according to the second community user identity of the first user and the corresponding relationship; obtain a first community user identity of the second user corresponding to the first community user identity of the first user and whose familiarity with the first user exceeds the threshold; find a second community user identity of the second user according to the first community user identity of the second user and the corresponding relationship; show a list of second users found corresponding to the second community user identity to the first user.

The user recommendation system in the SNS community generates the interaction frequency of the first user and the second user according to the interaction record between the first user and the second user in the first community, calculates familiarity of the first user and the second user according to the interaction frequency of the first user and the second user, and recommends the second user whose familiarity with the first user exceeds the threshold to the first user in the second community. A high familiarity of the first user and the second user indicates that the second user is a person who the first user may possibly know. The method calculates the familiarity between the users in other community, and recommends other users to the user in the current community according to the familiarity, and expands information sources that can be used for determining which users are persons who the user may possibly know, thereby obtaining more persons who the user may possibly know and improving the efficiency of expanding user relationship circle.

Figure 4:
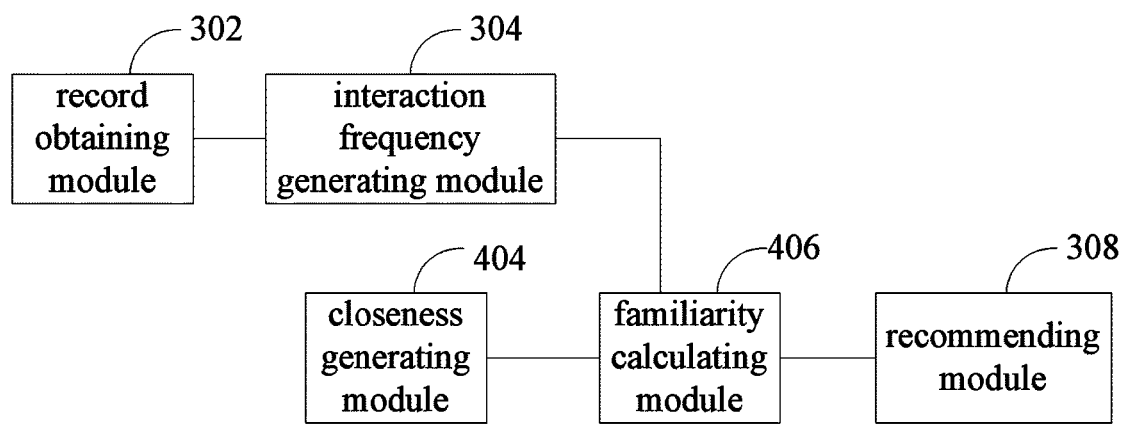
FIG. 4 is a block diagram of a user recommendation system in the SNS community according to another embodiment.

As shown in FIG. 4, in an embodiment, the user recommendation system in an SNS community includes a record obtaining module 302, an interaction frequency generating module 304, a closeness generating module 404, a familiarity calculating module 406 and a recommending module 308.

The closeness generating module 404 is configured to generate closeness of the first user and the second user according to a user relationship chain in the first community and a user relationship chain in the second community.

Specifically, the user relationship chain in the first community is a relationship chain established between users in the first community and includes a social relationship, such as a friend relationship, a listening-in relationship or a concern relationship, etc. The user relationship chain in the second community is a relationship chain established between users in the second community.

Moreover, in an embodiment, the closeness generating module 404 is configured to determine which relationship of the following relationships of the first user and the second user is in the first community according to the user relationship chain in the first community: the second user being a friend of the first user, the second user being a twice friend of the first user, the second user being a user that the first user listens in or concerns; configured to determine whether the second user is the twice friend of the first user in the second community according to the user relationship chain in the second community; further configured to increase the closeness of the first user and the second user according to a preset weight, if the second user is the friend of the first user, or the second user is the twice friend of the first user, or the second user is a user that the first user listens in or concerns in the first community, or the second user is the twice friend of the first user in the second community.

The second user being the twice friend of the first user means that the second user is a friend of a friend of the first user.

In an embodiment, the closeness generating module 404 can preset a weight corresponding to a relationship of the first user and the second user. Preferably, rank of weights corresponding to the following relationships is set from high to low: the second user being a friend of the first user in the first community, the second user being a user that the first user listens in or concerns in the first community, the second user being a twice friend of the first user in the second community, the second user being a twice friend of the first user in the first community. The closeness of the relationship of the first user and the second user in the above rank descends and the weight corresponding to the relationship also descends, thereby obtaining a more accurate closeness of the first user and the second user.

The closeness calculating module 406 is configured to calculate the familiarity of the first user and the second user according to the interaction frequency and the closeness of the first user and the second user.

Specifically, in an embodiment, a weight corresponding to the interaction frequency of the first user and the second user, and a weight corresponding to the closeness of the first user and the second user are preset. The closeness calculating module 406 increases the familiarity of the first user and the second user according to the interaction frequency and the closeness of the first user and the second user and the weights corresponding to the interaction frequency and the familiarity. The higher the interaction frequency and the closeness of the first user and the second user are, the higher the familiarity of the first user and the second user is.

The user recommendation system in the SNS community generates closeness between the users according to the user relationship chain of the current community and the user relationship chain of other community, calculates familiarity between the users according to the interaction frequency between the users and the closeness of the users, recommends a person who the user may possibly know to the user in the current community according to the familiarity between the users. The system calculates the familiarity between the users according to multi-aspect information of the current community and other community and can more accurately obtain an actual familiarity between the users, thereby improving the accuracy of recommending a person who the user may possibly know to the user.

Figure 5:
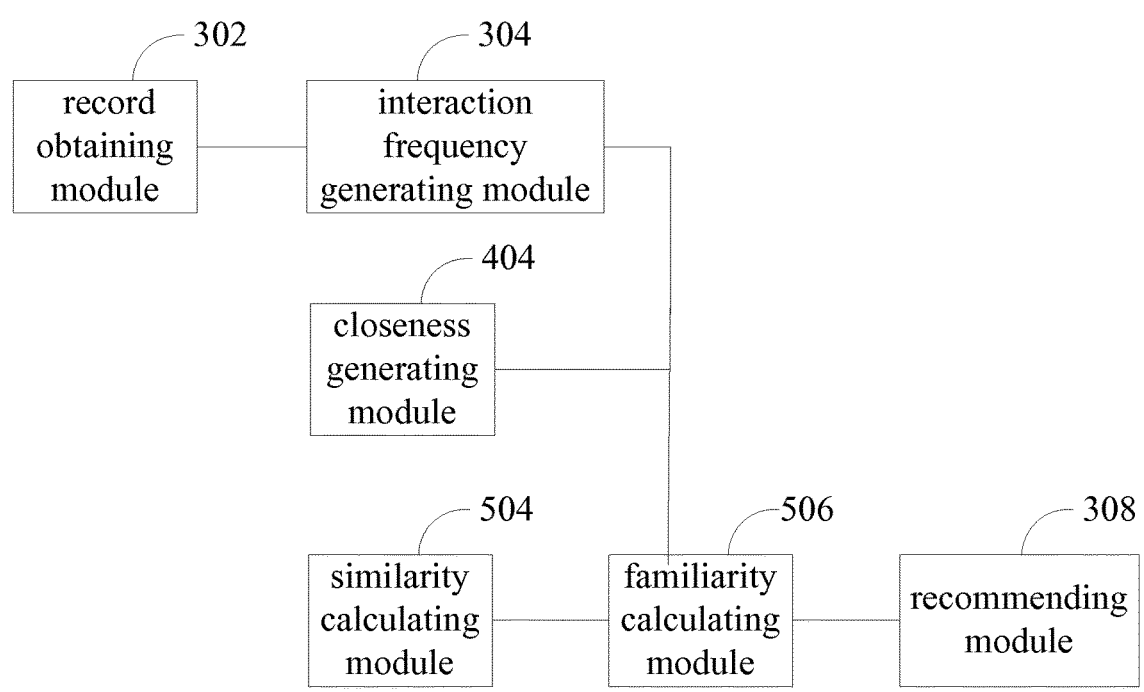
FIG. 5 is a block diagram of a user recommendation system in the SNS community according to yet another embodiment.

As shown in FIG. 5, in an embodiment, a user recommendation system in an SNS community includes a record obtaining module 302, an interaction frequency generating module 304, a closeness generating module 404, a similarity calculating module 504, a familiarity calculating module 506 and a recommending module 308.

The similarity calculating module 504 is configured to calculate similarity of the first user and the second user according to personal data of the first user and the second user in the first community and personal data of the first user and the second user in the second community.

Specifically, if the personal data of the first user are the same as or similar to the personal data of the second user in the first community, or the personal data of the first user are the same as or similar to the personal data of the second user in the second community, then the similarity calculating module 504 increases the similarity of the first user and the second user accordingly.

Specifically, in an embodiment, the personal data include hometown, education history, work history, current residence, etc. If the hometown, the education history, the work history, and the current residence of the first user are the same as or similar to the hometown, the education history, the work history, and the current residence of the second user in the first community or in the second community, then the similarity calculating module 504 increases the similarity of the first user and the second user according to a preset weight.

The familiarity calculating module 506 is configured to calculate the familiarity of the first user and the second user according to the interaction frequency, the closeness and the similarity of the first user and the second user.

Specifically, in an embodiment, weights corresponding to the interaction frequency, the closeness and the similarity of the first user and the second user are preset respectively. The familiarity calculating module 506 can increase the familiarity of the first user and the second user according to the interaction frequency, the closeness, the similarity and the weights corresponding to the interaction frequency, the closeness and the similarity. The higher the interaction frequency, the closeness and the similarity of the first user and the second user are, the higher the familiarity of the first user and the second user is.

The user recommendation system in the SNS community calculates similarity between the users according to the personal data of the users in the current community and the other community, calculates the familiarity between the users according to the interaction frequency, the closeness and the similarity between the users, and recommends a person who the user may possibly know to the user in the current community according to the familiarity between the users. The system calculates the familiarity between the users according to multi-aspect information of the current community and the other community and can more accurately obtain an actual familiarity between the users, thereby improving accuracy of recommending a person who the user may possibly know to the user.

Those skilled in the art should understand that whole or part of the methods in the embodiments could be carried by corresponding hardware instructed by computer programs; such programs could be stored in a computer-readable storage medium. When such programs are executed, the process of the methods in the embodiments is included. The storage medium can be magnetic disk, optical disk, read-only memory (ROM), or random access memory (RAM), etc.

Hardware executing environments related in the embodiments of the present disclosure may be mobile phones, tablet PCs and other mobile terminals which may install all kinds of client applications and load a variety of mobile terminal browsers. The embodiment of the present disclosure is achieved by the following solution: when an application in a mobile terminal executes page codes through a browser, the browser may monitor whether the page codes request to perform an action of calling a query class related interface, if yes, the browser intercept the action, which prevents remote codes from being executed by an application on browsers of mobile phones, tablet PCs and other mobile terminal devices, and effectively fixes a bug that the remote codes is executed to cause content of the mobile terminal to be maliciously tampered and deleted.

Figure 6:
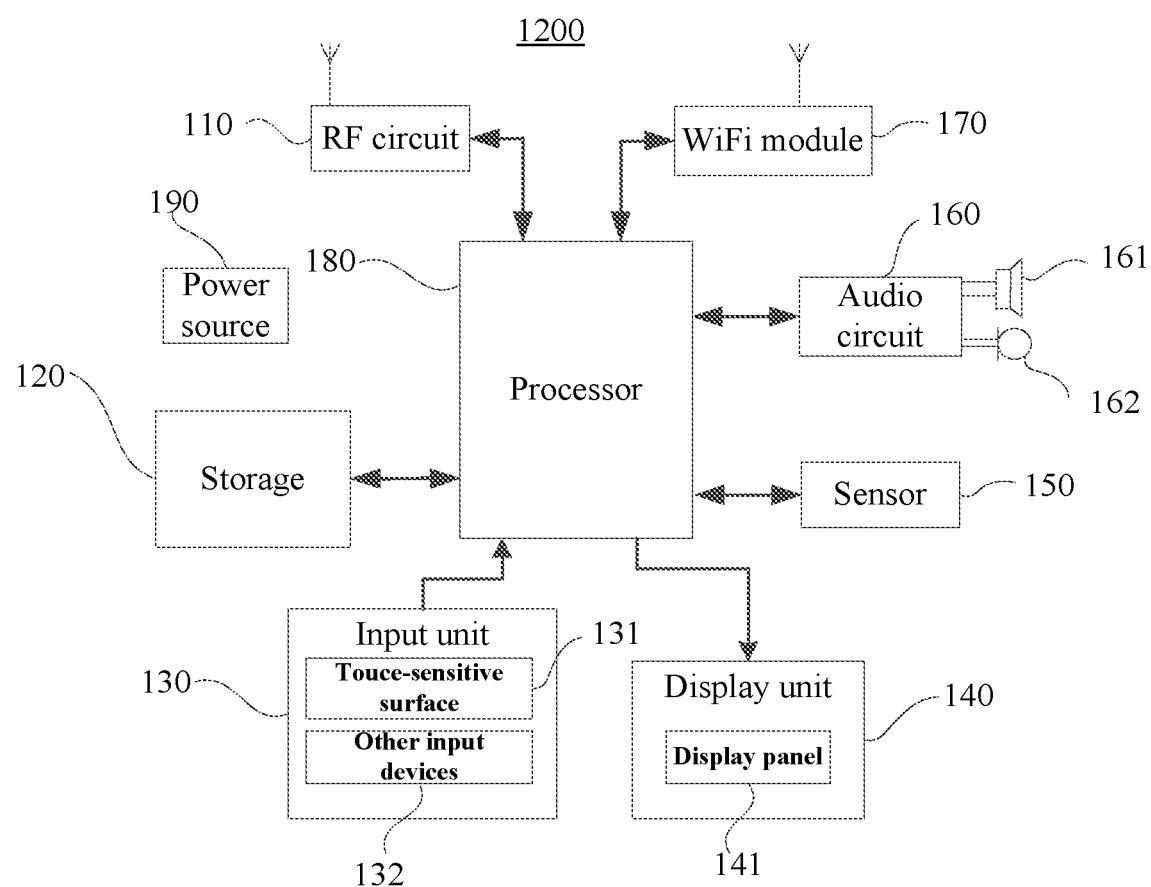
FIG. 6 is an exemplary block diagram of a mobile terminal, according to an embodiment.

FIG. 6 is an exemplary block diagram of a mobile terminal, according to an embodiment of the present disclosure. The mobile terminal may be the device itself with a browser which implements the method for preventing execution of remote codes of application operation in the browser.

Referring to FIG. 6, the mobile terminal 1200 may include components such as a Radio Frequency (RF) circuit 110, a storage 120 having one or more computer-readable media, an input unit 130, a display unit 140, a sensor 150, an audio circuit 160, a Wireless Fidelity WiFi module 170, a processor 180 having one or more processing units, and a power source 190. One having ordinary skill in the art will appreciate that the structure of the mobile terminal shown in FIG. 6 is not intended to limit the mobile terminal, and the mobile terminal may include more or less components, or some of the above components may be combined, or the arrangement of the components may be different.

The RF circuit 110 may receive and send signals during message receiving and sending processes or during calls, and particularly, to receive downlink messages from a base station and send the messages to one or more processors 180 for processing, and to send uplink data to the base station. Generally, the RF circuit includes but not limited to an antenna, at least one amplifier, a tuner, one or more oscillators, a subscriber identity module card (SIM card), a transceiver, a coupler, a low noise amplifier (LNA), and a duplexer. Furthermore, the RF circuit 110 may communicate with other devices by wireless communication and network. The wireless communication may utilize any communication standard or protocol, including but not limited to Global System of Mobile communication (GSM), General Packet Radio Service (GPRS), codes Division Multiple Access (CDMA), Wideband codes Division Multiple Access (WCDMA), Long Term Evolution (LTE), E-mail, and Short Messaging Service (SMS).

The storage 120 may store software programs and modules, and the processor 180 may request to perform various kinds of functional applications and data processing by running the software programs and modules stored in the storage 120. The storage 120 may mainly include a program storage area and a data storage area; the program storage area may store the operating system, at least one application required for functions (such as sound playing functions, image playing functions), etc; the data storage area may store the data created according to the usage of the mobile terminal 1200 (such as audio data and phone books), etc. In addition, the storage 120 may further include a high-speed random access storage and a non-volatile storage, such as at least one disk storage, flash storage, and other volatile solid state storages. Correspondingly, the storage 120 may also include a memory controller to provide an access of the processor 180 and the input unit 130 to the storage 120.

The input unit 130 may receive input numbers or string information, and generate signal inputs associated with user settings and function controls, such as from a keyboard, a mouse, a stylus, a track pad or a trackball. In detail, the input unit 130 may include a touch-sensitive surface 131 and other input devices 132. The touch-sensitive surface 131, may also be known as a touch screen or touch pad, which may collect user's touch operations on or adjacent to the touch-sensitive surface 131 (such as the operations on the touch-sensitive surface 131 or adjacent to the touch-sensitive surface 131 from the user by using any suitable object or accessory such as a finger or a touch pen) and drive the corresponding connection device according to preset formulas.

Alternatively, the touch-sensitive surface 131 may include a touch detecting device and a touch controller. The touch detecting device detects the orientation of the touch from the user, detects the signal generated from the touch, and transmits the signal to the touch controller; the touch controller receives touch information from the touch detecting device, converts the touch information to contact coordinates, transmits the contact coordinates to the processor 180, and executes the command from the processor 180. Furthermore, the touch-sensitive surface 131 may be a resistive type, a capacitive type, a RF type, and a surface acoustic wave type of touch-sensitive surface 131. Other than the touch-sensitive surface 131, the input unit 130 may further include other input devices 132 or input commands such as voice commands or motion commands, to name a few.

Specifically, other input devices 132 include but not limited to one or more of a physical keyboard, a function button (such as a volume control button and a switch button), a trackball, a mouse, an operation rod, a stylus or a wand.

The display unit 140 may display information input by the user or information provided to the user and various kinds of graphical user interfaces from the mobile terminal 1200, which is made up of a graph, a text, an icon, a video and any combination of these elements. The display unit 140 may include a display panel 141; alternatively, the display panel 141 may be a Liquid Crystal Display (LCD) or an Organic Light-Emitting Diode (OLED) display.

Furthermore, the touch-sensitive surface 131 may cover the display panel 141; after detecting a touch operation on the touch-sensitive surface 131 or adjacent to the touch-sensitive surface 131, the touch-sensitive surface 131 may transmit the touch operation to the processor 180 for determining the type of the touch event, and the processor 180 then provides a corresponding visual output on the display panel 141 according to the type of the touch event. Although in FIG. 6 the touch-sensitive surface 131 and the display panel 141 are two separated elements for realizing the input and output functions of the mobile terminal, in some embodiments, the touch-sensitive surface 131 and the display panel 141 may be integrally formed to realize the input and output functions of the mobile terminal.

The mobile terminal may further include at least one kind of sensor 150, such as an optical sensor, a motion sensor and other sensors. Specifically, the optical sensor may include an ambient light sensor and a proximity sensor; the ambient light sensor may adjust the brightness of the display panel 141 according to the darkness of the ambient light, and the proximity sensor may turn off the display panel 141 and/or the backlight when the mobile terminal 1200 gets close to the user's ear. As a motion sensor, an accelerometer may detect a value of an acceleration in each direction (being generally three axis), detect the value and direction of the gravity when being still, and may be used in applications of identifying gestures of the mobile terminal (such as a switch between the portrait orientation and landscape orientation, associated games, and a magnetometer gesture calibration) and in associated vibration-identified functions (such as a pedometer and knocking), etc.; the mobile terminal 1200 may further be, which causes the device with other sensors, such as a gyroscope, a barometer, a moisture meter, a thermometer and a RF sensor, which is not given in detail herein.

The audio circuit 160, the loudspeaker 161, and the microphone 162 may provide audio interfaces between the user and the mobile terminal 1200. The audio circuit 160 may transmit electrical signals converted from the received audio data to the loudspeaker 161 to be input as voice signals by the loudspeaker 161; in addition, the microphone 162 may convert the collected voice signals to electrical signals which are received and converted to audio data by the audio circuit 160; the audio data is then output to the processor 180 for processing and is further transmitted to, for example, another mobile terminal, or to the storage 120 for further processing via the RF circuit 110. The audio circuit 160 may further include an earphone jack to provide communications between an external earphone and the mobile terminal 1200.

WiFi is a short-range wireless transmission technology, the mobile terminal 1200 may assist the user in sending and receiving E-mails, browsing web pages, and accessing stream media through the WiFi module 170, which may provide the user with wireless access to the Internet. Although FIG. 6 shows the WiFi module 170, it may be understood that the WiFi module is not the essential component of the mobile terminal 1200 and may be omitted according to requirements without departing from the spirit of the present disclosure.

The processor 180 is the control center of the mobile terminal 1200. The processor 180 connects each part of the mobile terminal using various kinds of interfaces and circuitries, and request to performs various kinds of functions of the mobile terminal and processing data by running or executing the software programs and/or modules stored in the storage 120 and calling the data stored in the storage 120, thereby realizing overall monitoring of the mobile terminal. Alternatively, the processor 180 may include one or more processing units; preferably, the processor 180 integrates an application processor and a modulation and demodulation processor; the application processor mainly processes the operation system, user interfaces, and application programs, etc., and the modulation and demodulation processor mainly processes wireless communications. It may be understood that the modulation and demodulation processor cannot be integrated in the processor 180.

The mobile terminal 1200 may further include a power source 190 (such as a battery) for supplying power to each component; preferably, the power source may be logically connected to the processor 180 via a power management system, thereby managing the charging, discharging, and power consumption functions via the power management system. The power source 190 may further include one or more direct current or alternating current power sources, a recharge system, a power source failure detection circuit, a power supply converter or an inverter, a battery status indicator and any other component.

Although not shown, the mobile terminal 1200 may further include a camera and a Bluetooth module, etc., which is not given in detail herein. In the embodiments of the present disclosure, the display unit of the mobile terminal 1200 is a touch screen; the mobile terminal 1200 may further include storage which one or more programs which are stored in the storage and are executed by one or more, which causes the device processors.

The above described embodiments explains only several exemplary embodiments of the present invention; the descriptions are specified and detailed, while shall not be understood as to limit the invention to the precise forms disclosed. It shall be mentioned that for those skilled in the art, alternative embodiments could be made to which the present invention pertains without departing from its spirit and scope. Accordingly, the scope of the present invention is defined by the appended claims rather than the foregoing description and the exemplary embodiments described therein.

What is claimed is:

1. A user recommendation method for a system in a Social Networking Service (SNS) community, the method comprising:
by at least one processor to execute instructions stored in at least one memory coupled to the at least one processor to cause the system to perform:
obtaining at least one interaction record of at least one relationship interaction in a first SNS community between a first user and a second user;
determining an interaction frequency according to a corresponding frequency of the at least one relationship interaction in the first SNS community between the first user and the second user;
determining a closeness of the first user and the second user according to information of a first user relationship chain established between the first user and users in the first SNS community, and information of a second user relationship chain established between the second user and users in the second SNS community;
determining a familiarity of the first user and the second user according to the determined interaction frequency in the first SNS community between the first user and the second user and the determined closeness of the first user and the second user; and
providing, to the first user in a second SNS community, information indicating recommendation of the second user whose determined familiarity with the first user exceeds a familiarity threshold,
wherein
the determining the closeness of the first user and the second user according to the information of the first user relationship chain established between the first user and the users in the first SNS community, and the information of the second user relationship chain established between the second user and the users in the second SNS community, comprises:
determining whether the first user relationship chain of the first user in the first SNS community includes:
the second user being a friend of the first user,
the second user being a twice friend of the first user,
the second user being a user that the first user listens in as a listening-in relationship or of concern to the first user as a concern relationship;
determining whether the second user relationship of the second user in the second SNS community includes the second user being the twice friend of the first user in the second SNS community; and
increasing the closeness of the first user and the second user according to a weight, in response to one or any combinations of the determining that,
in the first SNS community,
the second user being the friend of the first user,
the second user being the twice friend of the first user, or
the second user being a user that the first user listens in as a listening-in relationship or of concern to the first user as a concern relationship, or
in the second SNS community,
the second user is the twice friend of the first user.

2. The user recommendation method for the system in the SNS community of claim 1, wherein the at least one interaction record includes at least one operation record of the at least one relationship interaction selected from a group of relationship interactions including visiting, commenting, replying, giving a like, forwarding, transmitting, and sharing between the first user and the second user.

3. The user recommendation method for the server in the SNS community of claim 1, wherein the execution of the instructions by at least one processor further causes:
setting a weight corresponding to a user relationship chain, among the user relationship chains, of the first user and the second user, respectively, to rank from high to low the user relationship chains of the first user and the second user, respectively;
wherein the weighted rank of the following relationship chains from high to low includes:
the second user being a friend of the first user in the first SNS community,
the second user being a user that the first user listens in or concerned to the first user in the first SNS community,
the second user being a twice friend of the first user in the second SNS community,
the second user being a twice friend of the first user in the first SNS community.

4. The user recommendation method for the server in the SNS community of claim 1, wherein the execution of the instructions by at least one processor further causes:
determining a similarity of the first user and the second user, according to personal data of the first user and the second user in the first SNS community and personal data of the first user and the second user in the second SNS community;
the determining of familiarity of the first user and the second user is according to the interaction frequency, the closeness, and the similarity.

5. The user recommendation method for the server in the SNS community of claim 4, wherein the determining of the familiarity of the first user and the second user is according to any combination of the interaction frequency, the closeness or the similarity by:
setting weights corresponding to the interaction frequency, the closeness and the similarity of the first user and the second user respectively;
increasing the familiarity of the first user and the second user according to any combination of the interaction frequency, the closeness, or the similarity and the weights corresponding to the interaction frequency, the closeness, or the similarity.

6. The user recommendation method for the server in the SNS community of claim 1, wherein
a first SNS community user identity and a second SNS community user identity of same user are different,
the first SNS community and the second SNS community share a user identity corresponding relationship database, and
the user identity corresponding relationship database stores a corresponding relationship between the first SNS community user identity and the second SNS community user identity of the same user;
the providing, to the first user in the second SNS community, the information indicating recommendation of the second user whose determined familiarity with the first user exceeds the familiarity threshold includes:
obtaining a second SNS community user identity of the first user;
finding a first SNS community user identity of the first user, according to the second SNS community user identity of the first user and the corresponding relationship between the first SNS community user identity and the second SNS community user identity of the first user in the user identity corresponding relationship database;

obtaining a first SNS community user identity of the second user corresponding to the first SNS community user identity of the first user and whose familiarity with the first user exceeds the threshold;

finding a second SNS community user identity of the second user, according to the first SNS community user identity of the second user and the corresponding relationship between the first SNS community user identity and the second SNS community user identity of the first user in the user identity corresponding relationship database;

providing, to the first user in the second SNS community, a selectable list of second users found corresponding to the second SNS community user identity whose determined familiarity with the first user exceeds the familiarity threshold as the information indicating the recommendation of the second user.

7. A system in a Social Networking Service (SNS) community, comprising:
at least one memory; and
at least one processor coupled to the at least one memory and to execute instructions stored in the at least one memory to cause the system to:
obtain at least one interaction record of at least one relationship interaction in a first SNS community between a first user and a second user;
determine an interaction frequency according to a corresponding frequency of the at least one relationship interaction in the first SNS community between the first user and the second user;
perform a determination of a closeness of the first user and the second user according to information of a first user relationship chain established between the first user and users in the first SNS community, and information of a second user relationship chain established between the second user and users in the second SNS community;
determine a familiarity of the first user and the second user according to the determined interaction frequency in the first SNS community between the first user and the second user and the determined closeness of the first user and the second user; and
provide, to the first user in a second SNS community, information indicating recommendation of the second user whose determined familiarity with the first user exceeds a familiarity threshold,
wherein
the determination of the closeness of the first user and the second user according to the information of the first user relationship chain established between the first user and the users in the first SNS community, and the information of the second user relationship chain established between the second user and the users in the second SNS community, comprises:
a determination of whether the first user relationship chain of the first user in the first SNS community includes:
the second user being a friend of the first user,
the second user being a twice friend of the first user,
the second user being a user that the first user listens in as a listening-in relationship or of concern to the first user as a concern relationship;
a determination of whether the second user relationship of the second user in the second SNS community includes the second user being the twice friend of the first user in the second SNS community; and
an increase of the closeness of the first user and the second user according to a weight, in response to one or any combinations of the determining that,
in the first SNS community,
the second user is the friend of the first user,
the second user is the twice friend of the first user, or
the second user is a user that the first user listens in as a listening-in relationship or of concern to the first user as a concern relationship, or
in the second SNS community,
the second user is the twice friend of the first user.

8. The system in the SNS community of claim 7, wherein the at least one interaction record includes at least one operation record of the at least one relationship interaction selected from a group of relationship interactions including visiting, commenting, replying, clicking a 'like' button, forwarding, transmitting, and sharing between the first user and the second user.

9. The system in the SNS community of claim 7, wherein the at least one processor to execute the instructions to further cause the system to set a weight corresponding to a user relationship chain, among the user relationship chains, of the first user and the second user, respectively, to rank from high to low the user relationship chains of the first user and the second user, respectively;
the weighted rank of the following relationship chains from high to low includes:
the second user being a friend of the first user in the first SNS community,
the second user being a user that the first user listens in or concerned to the first user in the first SNS community,
the second user being a twice friend of the first user in the second SNS community,
the second user being a twice friend of the first user in the first SNS community.

10. The system in the SNS community of claim 7, wherein the at least one processor to execute the instructions to further cause the system to determine a similarity of the first user and the second user, according to personal data of the first user and the second user in the first SNS community and personal data of the first user and the second user in the SNS second community;
the familiarity of the first user and the second user is determined according to the interaction frequency, the closeness and the similarity.

11. The system in the SNS community of claim 10, wherein
the familiarity of the first user and the second user is determined according to any combination of the interaction frequency, the closeness or the similarity,
the at least one processor to execute the instructions to further cause the system to:

set weights corresponding to the interaction frequency, the closeness and the similarity of the first user and the second user respectively, increase the familiarity of the first user and the second user according to any combination of the interaction frequency, the closeness, or the similarity and the weights corresponding to the interaction frequency, the closeness, or the similarity.

12. The system in the SNS community of claim 7, wherein a first SNS community user identity and a second SNS community user identity of same user are different, the first SNS community and the second SNS community share a user identity corresponding relationship database, and the user identity corresponding relationship database stores a corresponding relationship between the first SNS community user identity and the second SNS community user identity of the same user;

to provide, to the first user in the second SNS community, the information indicating recommendation of the second user whose determined familiarity with the first user exceeds the familiarity threshold, the at least one processor to execute the instructions to further cause the system to:

obtain a second SNS community user identity of the first user, find a first SNS community user identity of the first user, according to the second SNS community user identity of the first user and the corresponding relationship between the first SNS community user identity and the second SNS community user identity of the first user in the user identity corresponding relationship database, obtain a first SNS community user identity of the second user corresponding to the first SNS community user identity of the first user and whose familiarity with the first user exceeds the threshold, find a second SNS community user identity of the second user, according to the first SNS community user identity of the second user and the corresponding relationship between the first SNS community user identity and the second SNS community user identity of the first user in the user identity corresponding relationship database, and provide, to the first user in the second SNS community, a selectable list of second users found corresponding to the second SNS community user identity to the first user whose determined familiarity with the first user exceeds the familiarity threshold as the information indicating the recommendation of the second user.

13. At least one non-transitory computer storage medium comprising computer-executable instructions, the computer-executable instructions used for executing a user recommendation method for a system in a Social Networking Service (SNS) community, wherein the method for the system comprises:

obtaining at least one interaction record of at least one relationship interaction in a first SNS community between a first user and a second user;

determining an interaction frequency according to a corresponding frequency of the at least one relationship interaction in the first SNS community between the first user and the second user;

determining a closeness of the first user and the second user according to information of a first user relationship chain established between the first user and users in the first SNS community, and information of a second user relationship chain established between the second user and users in the second SNS community;

determining a familiarity of the first user and the second user according to the determined interaction frequency in the first SNS community between the first user and the second user and the determined closeness of the first user and the second user; and providing, to the first user in a second SNS community, information indicating recommendation of the second user whose determined familiarity with the first user exceeds a familiarity threshold, wherein the determining the closeness of the first user and the second user according to the information of the first user relationship chain established between the first user and the users in the first SNS community, and the information of the second user relationship chain established between the second user and the users in the second SNS community, comprises:

determining whether the first user relationship chain of the first user in the first SNS community includes:

the second user being a friend of the first user, the second user being a twice friend of the first user, the second user being a user that the first user listens in as a listening-in relationship or of concern to the first user as a concern relationship;

determining whether the second user relationship of the second user in the second SNS community includes the second user being the twice friend of the first user in the second SNS community; and increasing the closeness of the first user and the second user according to a weight, in response to one or any combinations of the determining that, in the first SNS community, the second user is the friend of the first user, the second user is the twice friend of the first user, or the second user is a user that the first user listens in as a listening-in relationship or of concern to the first user as a concern relationship, or in the second SNS community, the second user is the twice friend of the first user.

* * * * *